United States Patent
Yogo et al.

(10) Patent No.: US 12,552,356 B2
(45) Date of Patent: Feb. 17, 2026

(54) VEHICLE BRAKING DEVICE

(71) Applicant: ADVICS CO., LTD., Kariya (JP)

(72) Inventors: Kazutoshi Yogo, Kariya (JP); Masataka Sakaue, Kariya (JP)

(73) Assignee: ADVICS CO., LTD., Kariya (JP)

( * ) Notice: Subject to any disclaimer, the term of this patent is extended or adjusted under 35 U.S.C. 154(b) by 693 days.

(21) Appl. No.: 17/802,810

(22) PCT Filed: Mar. 15, 2021

(86) PCT No.: PCT/JP2021/010421
§ 371 (c)(1),
(2) Date: Aug. 26, 2022

(87) PCT Pub. No.: WO2021/187435
PCT Pub. Date: Sep. 23, 2021

(65) Prior Publication Data
US 2023/0100969 A1     Mar. 30, 2023

(30) Foreign Application Priority Data
Mar. 19, 2020    (JP) .................... 2020-049272

(51) Int. Cl.
*B60T 13/74*     (2006.01)
*B60T 8/17*     (2006.01)
(Continued)

(52) U.S. Cl.
CPC ............. *B60T 13/147* (2013.01); *B60T 8/17* (2013.01); *B60T 8/42* (2013.01); *B60T 13/148* (2013.01);
(Continued)

(58) Field of Classification Search
CPC .... B60T 13/745; B60T 13/686; B60T 11/165; B60T 2270/403; B60T 2270/406; B60T 2270/412
See application file for complete search history.

(56) References Cited

U.S. PATENT DOCUMENTS 12,291,177 B2 *   5/2025   Kinder ................... B60T 17/221
2011/0049971 A1 *   3/2011   Sano ...................... B60T 13/662
                                                                         303/114.1
(Continued)

FOREIGN PATENT DOCUMENTS

| DE | 102020106286 A1 | 2/2021 |
|---|---|---|
| WO | 2011105405 A1 | 9/2011 |
| WO | 2019105749 A1 | 6/2019 |

OTHER PUBLICATIONS

International Search Report (PCT/ISA/210) with translation and Written Opinion (PCT/ISA/237) mailed on May 11, 2021, by the Japan Patent Office as the International Searching Authority for International Application No. PCT/JP2021/010421.
(Continued)

*Primary Examiner* — Bradley T King
(74) *Attorney, Agent, or Firm* — BUCHANAN INGERSOLL & ROONEY PC (57) ABSTRACT

A vehicle braking device includes: a first hydraulic pressure output unit that is connected to a master chamber through a first liquid passage and outputs hydraulic pressure to first wheel cylinders based on a hydraulic pressure of the first liquid passage; a hydraulic pressure generating unit that generates hydraulic pressure independently of a master cylinder; a second hydraulic pressure output unit that is connected to the hydraulic pressure generating unit through a second liquid passage and outputs hydraulic pressure to second wheel cylinders based on a hydraulic pressure of the second liquid passage; a normally closed communication
(Continued)

control valve that is provided in a communication passage connecting the first liquid passage and the second liquid passage and opens and closes the communication passage; and a normally open master cut valve in the first liquid passage on the master cylinder side relative to a connection portion with the communication passage.

7 Claims, 5 Drawing Sheets

(51) Int. Cl.
    *B60T 8/42*                 (2006.01)
    *B60T 13/14*              (2006.01)
    *B60T 13/68*              (2006.01)
    *B60T 17/18*              (2006.01)

(52) U.S. Cl.
    CPC ............ *B60T 13/68* (2013.01); *B60T 13/745* (2013.01); *B60T 17/18* (2013.01); *B60T 2270/403* (2013.01)

(56) References Cited

U.S. PATENT DOCUMENTS

| | | | |
|---|---|---|---|
| 2012/0073285 A1* | 3/2012 | Sakuma | B60T 11/232 |
| | | | 60/538 |
| 2012/0112525 A1 | 5/2012 | Shimada | |
| 2012/0306260 A1 | 12/2012 | Ohkubo et al. | |
| 2013/0041565 A1* | 2/2013 | Fujiki | B60W 10/08 |
| | | | 701/70 |
| 2014/0354036 A1 | 12/2014 | Koo | |
| 2016/0200307 A1* | 7/2016 | Feigel | B60T 13/588 |
| | | | 303/6.01 |
| 2017/0129469 A1* | 5/2017 | Besier | B60T 13/142 |
| 2018/0215366 A1* | 8/2018 | Leiber | B60T 8/4022 |
| 2019/0299962 A1* | 10/2019 | Leiber | B60T 17/226 |
| 2019/0344769 A1* | 11/2019 | Zimmermann | B60T 8/326 |
| 2020/0056962 A1* | 2/2020 | Wodrich | B60T 13/745 |
| 2020/0139948 A1* | 5/2020 | Leiber | B60T 8/268 |
| 2020/0139949 A1* | 5/2020 | Dolmaya | B60T 8/4081 |
| 2020/0172067 A1* | 6/2020 | Einig | B60T 8/409 |
| 2020/0216047 A1* | 7/2020 | Leiber | B60T 7/042 |
| 2020/0276963 A1* | 9/2020 | Zimmermann | B60T 13/686 |
| 2020/0339086 A1* | 10/2020 | Grimm | B60T 8/326 |
| 2020/0361439 A1* | 11/2020 | Neu | B60T 13/146 |
| 2020/0369252 A1 | 11/2020 | Biller | |
| 2021/0053540 A1* | 2/2021 | Besier | B60T 13/58 |
| 2021/0053544 A1 | 2/2021 | Seol et al. | |
| 2021/0188237 A1* | 6/2021 | Zimmermann | B60T 8/326 |
| 2022/0105918 A1* | 4/2022 | Leiber | B60T 13/146 |
| 2022/0135010 A1* | 5/2022 | Leiber | B60T 13/686 |
| | | | 303/3 |
| 2022/0185254 A1* | 6/2022 | Nakayasu | B60T 13/686 |
| 2023/0053950 A1* | 2/2023 | Leiber | B60T 13/745 |
| 2024/0067150 A1* | 2/2024 | Stanojkovski | B60T 13/745 |
| 2025/0145136 A1* | 5/2025 | Weh | B60T 8/345 |
| 2025/0153697 A1* | 5/2025 | Courth | B60T 13/148 |

OTHER PUBLICATIONS

U.S. Appl. No. 17/802,840, filed Aug. 26, 2022, Yasunori Sakata.

\* cited by examiner

VEHICLE BRAKING DEVICE

TECHNICAL FIELD

The present disclosure relates to a vehicle braking device.

BACKGROUND ART

In some vehicle braking devices, two systems of wheel cylinders are connected in consideration of occurrence of a failure. For example, in a vehicle braking device described in WO 2019/105749 A1, an output liquid passage of an electric cylinder is branched into a first system and a second system.

CITATIONS LIST

Patent Literature

Patent Literature 1: WO 2019/105749 A1 SUMMARY

Technical Problems

A vehicle braking device is required to appropriately generate a braking force by one system not only upon occurrence of a failure of the device such as an electrical failure, but also upon occurrence of liquid leakage in the other system. An object of the present disclosure is to provide a vehicle braking device having a new configuration capable of appropriately generating a braking force upon occurrence of a failure of the device and occurrence of liquid leakage.

Solutions to Problems

A vehicle braking device according to the present disclosure includes: a first hydraulic pressure output unit that is connected to a master chamber of a master cylinder through a first liquid passage and outputs a hydraulic pressure to a first wheel cylinder based on a hydraulic pressure of the first liquid passage; a hydraulic pressure generating unit that generates a hydraulic pressure independently of the master cylinder; a second hydraulic pressure output unit that is connected to the hydraulic pressure generating unit through a second liquid passage and outputs a hydraulic pressure to a second wheel cylinder based on a hydraulic pressure of the second liquid passage; a communication control valve provided in a communication passage connecting the first liquid passage and the second liquid passage, the communication control valve being a normally closed electromagnetic valve that opens and closes the communication passage; and a master cut valve that is a normally open electromagnetic valve provided on the first liquid passage on a master cylinder side relative to a connection portion with the communication passage.

Advantageous Effects

According to the present disclosure, in a normal state of the hydraulic pressure generating unit, the output hydraulic pressure of the hydraulic pressure generating unit is introduced into the first liquid passage through the communication passage, a hydraulic pressure can be output from the first hydraulic pressure output unit to the first wheel cylinder based on the output hydraulic pressure, and a hydraulic pressure can be output from the second hydraulic pressure output unit to the second wheel cylinder based on the hydraulic pressure of the second liquid passage.

On the other hand, when a failure is occurring in the hydraulic pressure generating unit, the output hydraulic pressure of the master cylinder is introduced into the first liquid passage, and a hydraulic pressure can be output from the first hydraulic pressure output unit to the first wheel cylinder based on the hydraulic pressure of the first liquid passage.

In addition, even if liquid leakage (leakage of brake liquid) occurs in a second system including the hydraulic pressure generating unit, the second liquid passage, the second hydraulic pressure output unit, and the second wheel cylinder, the communication passage is cut off by the communication control valve, and a hydraulic pressure can be output to the first wheel cylinder by the master cylinder and the first hydraulic pressure output unit. Meanwhile, even if liquid leakage occurs in a first system including the master cylinder, the first liquid passage, the first hydraulic pressure output unit, and the first wheel cylinder, the communication passage can be cut off by the communication control valve, and a hydraulic pressure can be output to the second wheel cylinder by the hydraulic pressure generating unit and the second hydraulic pressure output unit.

In addition, according to the present disclosure, since the communication passage is cut off by the communication control valve upon occurrence of power supply failure, a hydraulic pressure can be output from the master cylinder to the first wheel cylinder. As described above, according to the new configuration of the present, braking force can be appropriately generated even upon occurrence of failure of the device and occurrence of liquid leakage.

DESCRIPTION OF EMBODIMENTS

Hereinafter, embodiments of the present will be described with reference to the drawings. In the following embodiments, identical or equivalent parts are given identical reference signs in the drawings. Each drawing used for the description is a conceptual diagram.

First Embodiment

Figure 1:
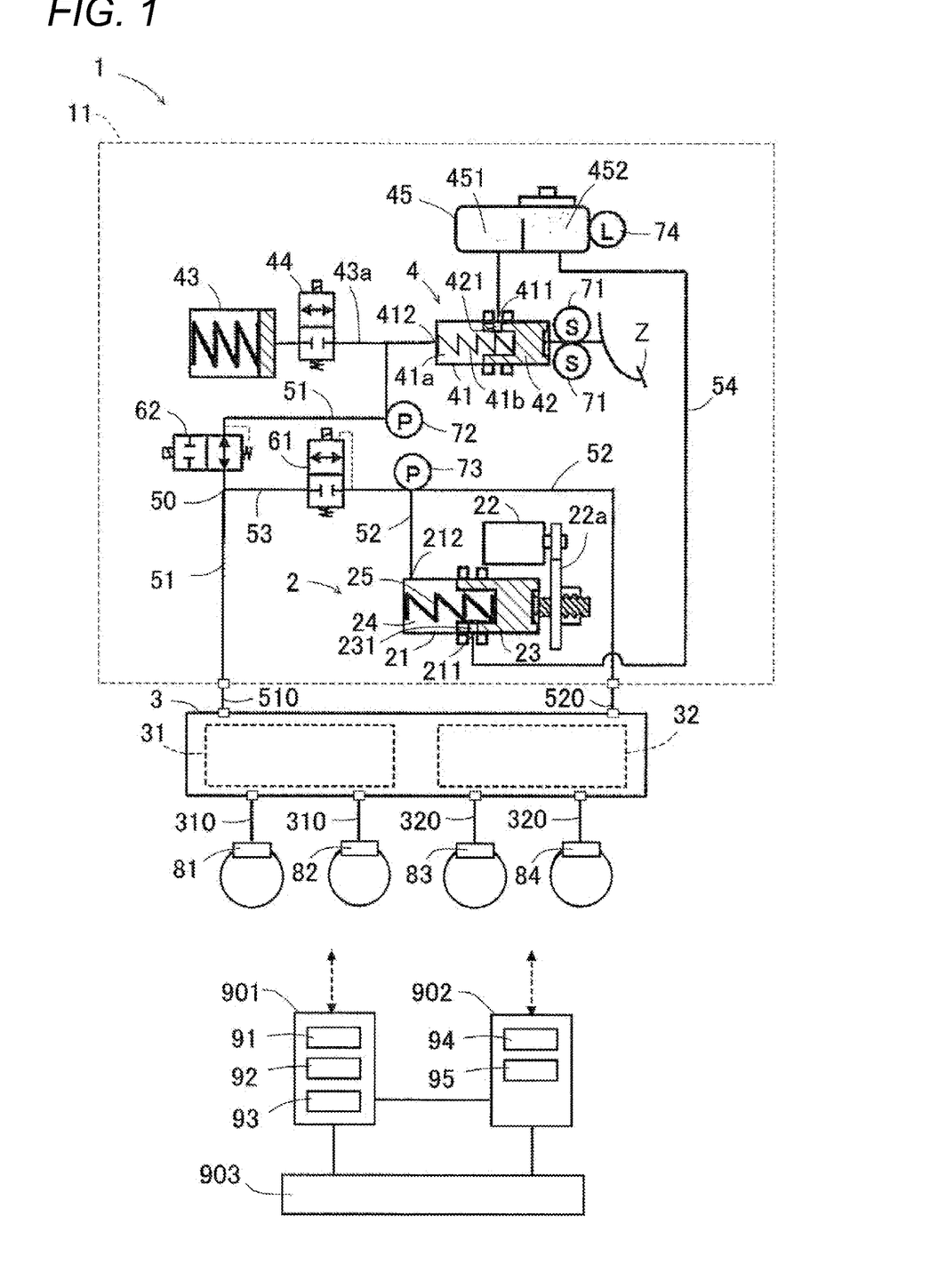
FIG. 1 is a configuration diagram of a vehicle braking device according to a first embodiment.

As illustrated in FIG. 1, a vehicle braking device 1 of a first embodiment includes an upstream unit 11, an actuator 3 constituting a downstream unit, a first brake ECU 901, a second brake ECU 902, and a power supply device 903. The upstream unit 11 is configured to be able to supply a basal hydraulic pressure to the downstream unit.

The upstream unit 11 includes an electric cylinder (corresponding to a "hydraulic pressure generating unit") 2, a master cylinder unit 4, a first liquid passage 51, a second liquid passage 52, a communication passage 53, a brake liquid supply passage 54, a communication control valve 61, and a master cut valve 62. The first brake ECU 901 controls at least the upstream unit 11. The second brake ECU 902 controls at least the actuator 3. FIG. 1 illustrates a non-energized state of the vehicle braking device 1.

The electric cylinder 2 is a pressurizing unit (pressure adjusting unit) that is connected to a reservoir 45 and can pressurize first wheel cylinders 81 and 82 and second wheel cylinders 83 and 84. The first wheel cylinders 81 and 82 are wheel cylinders of a first system, and the second wheel cylinders 83 and 84 are wheel cylinders of a second system. The first system is a system to which a brake liquid is supplied through the first liquid passage 51, and the second system is a system to which a brake liquid is supplied through the second liquid passage 52. In the first embodiment, for example, the first wheel cylinders 81 and 82 are provided on front wheels, and the second wheel cylinders 83 and 84 are provided on rear wheels.

The electric cylinder 2 includes a cylinder 21, an electric motor 22, a piston 23, an output chamber 24, and a biasing member 25. The electric motor 22 is connected to the piston 23 with a linear motion mechanism 22a that converts rotational motion into linear motion interposed therebetween. The electric cylinder 2 is a single-type electric cylinder in which the single output chamber 24 is provided in the cylinder 21.

The piston 23 slides in an axial direction in the cylinder 21 by driving of the electric motor 22. The piston 23 has a bottomed cylindrical shape that is open on one side in the axial direction and has a bottom surface on the other side in the axial direction. That is, the piston 23 includes a tubular portion that forms the opening and a columnar portion that forms the bottom surface (pressure receiving surface).

Figure 2:
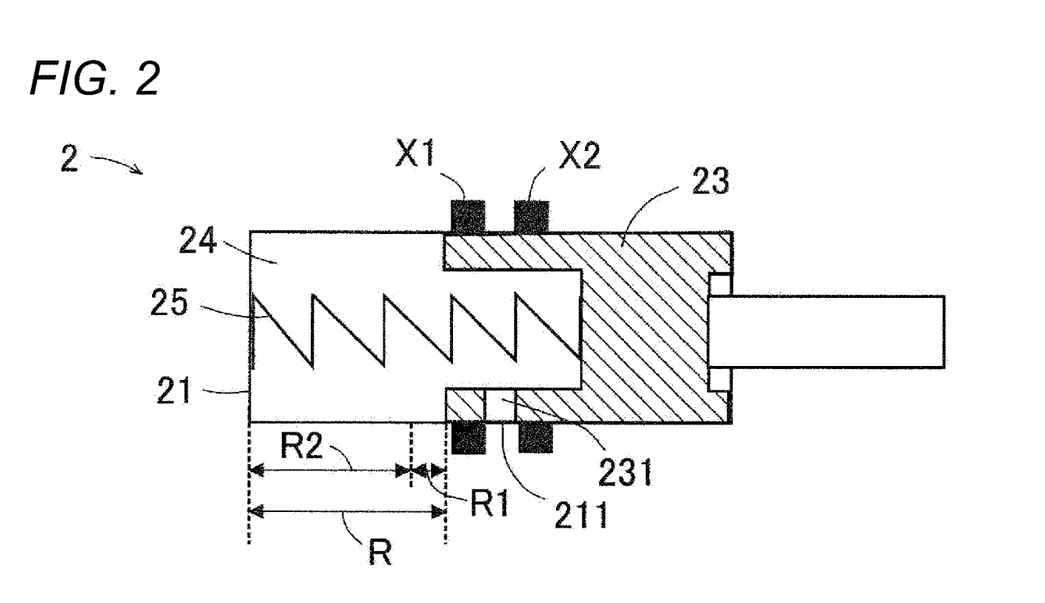
FIG. 2 is a conceptual diagram for explaining an electric cylinder according to the first embodiment.

The output chamber 24 is partitioned by the cylinder 21 and the piston 23, and a volume thereof changes by movement of the piston 23. The output chamber 24 is connected to the reservoir 45 and the actuator 3. As illustrated in FIG. 2, the piston 23 slides in a sliding region R including a position where the volume of the output chamber 24 is minimized and a position where the volume of the output chamber 24 is maximized in the axial direction. The sliding region R includes a communication region R1 that allows the output chamber 24 and the reservoir 45 to be communicated with each other, and a cutoff region R2 that cuts off the output chamber 24 and the reservoir 45 from each other. The communication region R1 includes an initial position (the positions in FIGS. 1 and 2) of the piston 23 at which the volume of the output chamber 24 is maximized. The cutoff region R2 includes a position of the piston 23 where the volume of the output chamber 24 is minimized. The cutoff region R2 is larger than the communication region R1 in the axial direction. In FIG. 2, the regions R, R1, and R2 are illustrated based on a position of one end (tip) of the piston 23 in the axial direction.

More specifically, the cylinder 21 has an input port 211 and an output port 212. The output port 212 allows the output chamber 24 and the second liquid passage 52 to be communicated with each other. The input port 211 overlaps the tubular portion of the piston 23 when the piston 23 is at the initial position. The tubular portion of the piston 23 has a through-hole 231. The through-hole 231 faces (overlaps) the input port 211 when the piston 23 is at the initial position.

The output chamber 24 and the reservoir 45 are communicated with each other in a state where the input port 211 and the through-hole 231 overlap each other. As the piston 23 moves to one side in the axial direction, a width by which the input port 211 and the through-hole 231 overlap each other decreases. In a case where the input port 211 and the through-hole 231 do not overlap each other, the output chamber 24 and the reservoir 45 are cut off from each other. The input port 211 is provided near one end surface, in the axial direction, of the columnar portion of the piston 23 (a pressure receiving surface of the piston 23) at the initial position. The cylinder 21 is provided with seal members X1 and X2 (see FIG. 2). The input port 211 is provided between the seal member X1 and the seal member X2.

The larger an overlap distance (a width of the through-hole 231 and/or the input port 211 in the axial direction) becomes, the larger the communication region R1 becomes. In the first embodiment, the input port 211 and the through-hole 231 have a same level of width in the axial direction. In movement of the piston 23 to one side in the axial direction, the communication region R1 continues until the piston 23 moves from the initial position by a predetermined amount (the overlap distance). The biasing member 25 is a spring that is disposed in the output chamber 24 and biases the piston 23 to the other side in the axial direction (toward the initial position).

The communication region R1 is a region between the initial position of the piston 23 and a position away from the initial position toward the one side in the axial direction by a predetermined amount. In the first embodiment, the predetermined amount is equal to or less than the width of the input port 211 in the axial direction. A flow passage cross-sectional area (opening area) of the input port 211 is maximized only at the initial position of the piston 23.

(Summary of Electric Cylinder)

As described above, the electric cylinder 2 is a device that generates a hydraulic pressure in the output chamber 24 when the piston 23 driven by the electric motor 22 slides in the cylinder 21, and is configured such that the output chamber 24 is connected to the reservoir 45 that stores a brake liquid when a relative position between the piston 23 and the cylinder 21 is a predetermined connection position (connection relative position). Furthermore, the electric cylinder 2 includes the biasing member 25 that biases the piston 23 to the side opposite to the output chamber 24, and is configured such that the relative position between the piston 23 and the cylinder 21 moves to the initial position when the electric motor 22 is not energized. In the first embodiment, the connection position is the initial position. Note that the connection position is not limited to the initial position. For example, the electric cylinder 21 and the reservoir 45 may be configured to be hydraulically connected in a state where the piston 23 is positioned in a direction in which the volume of the output chamber 24 becomes smaller than at the initial position. In this case, in a state where the piston 23 is located at the initial position, the electric cylinder 21 is not hydraulically connected to the reservoir 45.

The actuator 3 is a pressure adjusting unit (downstream unit) including a first hydraulic pressure output unit 31 configured to be able to adjust a pressure of the first wheel cylinders 81 and 82 and a second hydraulic pressure output unit 32 configured to be able to adjust a pressure of the second wheel cylinders 83 and 84. The actuator 3 is connected to the electric cylinder 2.

The first hydraulic pressure output unit 31 is configured to be able to increase the hydraulic pressure of the first wheel cylinders 81 and 82 without increasing a basal hydraulic pressure generated by the upstream unit 11. In other words, the first hydraulic pressure output unit 31 is configured to pressurize the first wheel cylinders 81 and 82 by generating a differential pressure between an input hydraulic pressure and the hydraulic pressure of the first wheel cylinders 81 and 82. Similarly, the second hydraulic pressure output unit 32 is configured to be able to increase the hydraulic pressure of the second wheel cylinders 83 and 84 without increasing the basal hydraulic pressure. In other words, the second hydraulic pressure output unit 32 is configured to pressurize the second wheel cylinders 83 and 84 by generating a differential pressure between an input hydraulic pressure and the hydraulic pressure of the second wheel cylinders 83 and 84.

The actuator 3 is a so-called ESC actuator, and can independently adjust the hydraulic pressures of the wheel cylinders 81 to 84. The actuator 3 executes, for example, anti-skid control (also referred to as ABS control), electronic stability control (ESC), traction control, or the like in accordance with control of the second brake ECU 902. The first hydraulic pressure output unit 31 and the second hydraulic pressure output unit 32 are independent of each other on a hydraulic pressure circuit of the actuator 3. A configuration of the actuator 3 will be described later.

The master cylinder unit 4 is a unit that is connected to the reservoir 45 and mechanically supplies a brake liquid to the first hydraulic pressure output unit 31 of the actuator 3 in accordance with an operation amount (stroke and/or tread force) of a brake operation member Z. The master cylinder unit 4 and the electric cylinder 2 can generate hydraulic pressures independently of each other. The master cylinder unit 4 is configured to be able to pressurize the first wheel cylinders 81 and 82 via the first hydraulic pressure output unit 31. The master cylinder unit 4 includes a master cylinder 41 and a master piston 42.

The master cylinder 41 is a bottomed cylindrical member. The master cylinder 41 has an input port 411 and an output port 412. The master piston 42 is a piston member that slides in the master cylinder 41 in accordance with an operation amount of the brake operation member Z. The mater piston 42 has a bottomed cylindrical shape that is open on one side in the axial direction and has a bottom surface on the other side in the axial direction.

In the master cylinder 41, a single master chamber 41a is formed by the master piston 42. In other words, in the master cylinder 41, the master chamber 41a is formed by the master cylinder 41 and the master piston 42. A volume of the master chamber 41a is changed by movement of the master piston 42. As the master piston 42 moves to the one side in the axial direction, the volume of the master chamber 41a decreases, and a hydraulic pressure (hereinafter referred to as a "master pressure") in the master chamber 41a increases. The master chamber 41a is provided with a biasing member 41b that biases the master piston 42 toward an initial position (toward the other side in the axial direction). The master cylinder unit 4 of the first embodiment is a single-type master cylinder unit.

The output port 412 allows the master chamber 41a and the first liquid passage 51 to be communicated with each other. The input port 411 allows the master chamber 41a and the reservoir 45 to be communicated with each other through a through-hole 421 formed in a tubular portion of the master piston 42. At the initial position of the master piston 42 where the volume of the master chamber 41a is maximized, the input port 411 and the through-hole 421 overlap, and the master chamber 41a and the reservoir 45 are communicated with each other. When the master piston 42 moves from the initial position toward the one side in the axial direction by a predetermined amount (overlap distance), the connection between the master chamber 41a and the reservoir 45 is cut off.

The master cylinder unit 4 is provided with a stroke simulator 43 and a simulator cut valve 44. The stroke simulator 43 is a device that generates a reaction force (load) with respect to an operation of the brake operation member Z. When the brake operation is released, the biasing member 41b returns the master piston 42 to the initial position. The stroke simulator 43 includes, for example, a cylinder, a piston, and a biasing member. The stroke simulator 43 and the output port 412 of the master cylinder 41 are connected through a liquid passage 43a. The simulator cut valve 44 is a normally closed electromagnetic valve provided in the liquid passage 43a.

(Liquid Passages and Electromagnetic Valves)

The first liquid passage 51 connects the master chamber 41a and the first hydraulic pressure output unit 31. The second liquid passage 52 connects the electric cylinder 2 and the second hydraulic pressure output unit 32. The communication passage 53 connects the first liquid passage 51 and the second liquid passage 52.

The communication control valve 61 is a normally closed electromagnetic valve provided in the communication passage 53. The communication control valve 61 permits or prohibits supply of the brake liquid to the first hydraulic pressure output unit 31 by the electric cylinder 2. In the communication control valve 61, a valving element is disposed closer to the first wheel cylinders 81 and 82 (first system side) than a valve seat in order to prevent backflow of the brake liquid from the first wheel cylinders 81 and 82 to the electric cylinder 2 when the valve is closed. With this configuration, even in a case where the hydraulic pressure of the first wheel cylinders 81 and 82 becomes higher than an output hydraulic pressure of the electric cylinder 2 when the communication control valve 61 is closed, a force is applied to the valving element in a direction of being pressed against the valve seat (self-sealed), so that the valve is kept closed.

The master cut valve 62 is a normally open electromagnetic valve provided in the first liquid passage 51 between a connection portion 50 between the first liquid passage 51 and the communication passage 53 and the master cylinder 41. The master cut valve 62 permits or prohibits supply of the brake liquid from the master cylinder unit 4 to the first hydraulic pressure output unit 31.

The brake liquid supply passage 54 connects the reservoir 45 and the input port 211 of the electric cylinder 2. The reservoir 45 stores the brake liquid, and an internal pressure thereof is maintained at atmospheric pressure. An inside of the reservoir 45 is partitioned into two chambers 451 and 452 in each of which the brake liquid is stored. The master cylinder unit 4 is connected to the one chamber 451 of the reservoir 45, and the electric cylinder 2 is connected to the other chamber 452 through the brake liquid supply passage 54. The reservoir 45 may be constituted by two separate reservoirs instead of two chambers.

(Configuration Example of Actuator)

Figure 3:
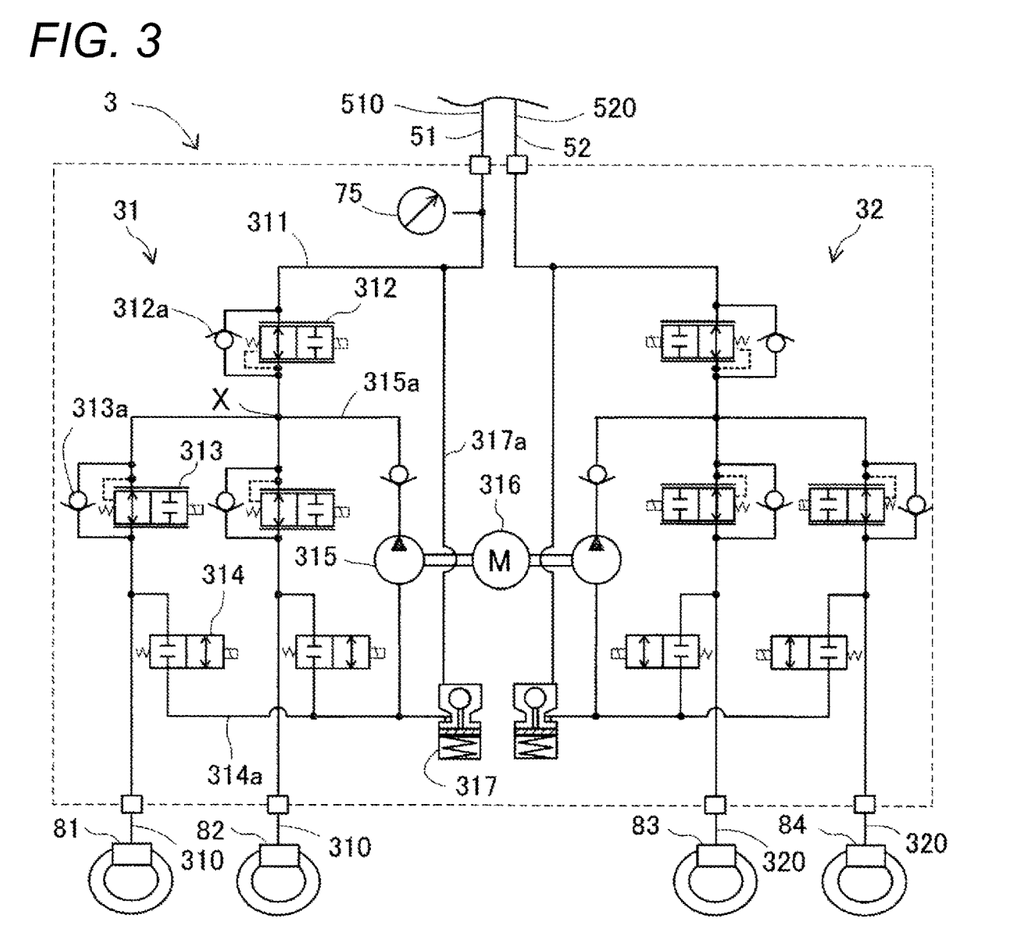
FIG. 3 is a configuration diagram of an actuator according to the first embodiment.

A configuration example of the actuator 3 will be briefly described by using a liquid passage connected to the first wheel cylinder 81 as an example. As illustrated in FIG. 3, the first hydraulic pressure output unit 31 of the actuator 3 mainly includes a liquid passage 311, a differential pressure control valve 312, a holding valve 313, a pressure reducing valve 314, a pump 315, an electric motor 316, a reservoir 317, and a reflux liquid passage 317a.

The liquid passage 311 connects the first liquid passage 51 and the first wheel cylinder 81. A pressure sensor 75 is provided in the liquid passage 311. The differential pressure control valve 312 is a normally open linear solenoid valve. By controlling an opening degree of the differential pressure control valve 312 (force toward a valve closing side by electromagnetic force), a differential pressure can be generated between the upstream and downstream. A check valve 312a that permits only flow of the brake liquid from the first liquid passage 51 to the first wheel cylinder 81 is provided in parallel with the differential pressure control valve 312.

The holding valve 313 is a normally open electromagnetic valve provided between the differential pressure control valve 312 and the first wheel cylinder 81 in the liquid passage 311. A check valve 313a is provided in parallel with the holding valve 313. The pressure reducing valve 314 is a normally closed electromagnetic valve provided in a pressure reducing liquid passage 314a. The pressure reducing liquid passage 314a connects a portion of the liquid passage 311 between the holding valve 313 and the first wheel cylinder 81 and the reservoir 317.

The pump 315 is operated by driving force of the electric motor 316. The pump 315 is provided in a pump liquid passage 315a. The pump liquid passage 315a connects a portion (hereinafter referred to as a "branch portion X") of the liquid passage 311 between the differential pressure control valve 312 and the holding valve 313 and the reservoir 317. When the pump 315 operates, the brake liquid in the reservoir 317 is discharged to the branch portion X.

The reservoir 317 is a pressure adjusting reservoir. The reflux liquid passage 317a connects the first liquid passage 51 and the reservoir 317. The reservoir 317 is configured such that the brake liquid in the reservoir 317 is preferentially sucked by operation of the pump 315, and when the brake liquid in the reservoir 317 decreases, the valve is opened, and the brake liquid is sucked from the first liquid passage 51 through the reflux liquid passage 317a.

In a case where the first wheel cylinder 81 is pressurized by the actuator 3, the second brake ECU 902 applies a control current according to a target differential pressure (the hydraulic pressure of the first wheel cylinder 81>the hydraulic pressure of the first liquid passage 51) to the differential pressure control valve 312 to close the differential pressure control valve 312. At this time, the holding valve 313 is opened, and the pressure reducing valve 314 is closed. Furthermore, the pump 315 operates, and thereby the brake liquid is supplied from the first liquid passage 51 to the branch portion X via the reservoir 317. As a result, the first wheel cylinder 81 is pressurized.

When a difference between the hydraulic pressure of the first wheel cylinder 81 (hereinafter referred to as a "wheel pressure") and the hydraulic pressure of the first liquid passage 51 is about to become higher than the target differential pressure, the differential pressure control valve 312 opens due to a relationship of force. The wheel pressure after the pressurization is a sum of the hydraulic pressure of the first liquid passage 51, that is, the basal hydraulic pressure, and the target differential pressure. In this manner, the actuator 3 pressurizes the wheel cylinders 81 to 84 by generating a differential pressure between the basal hydraulic pressure, which is the output hydraulic pressure of the electric cylinder 2, and the wheel pressure. In pressurization control, the actuator 3 applies an additional pressure (a hydraulic pressure corresponding to the differential pressure) to the basal hydraulic pressure without affecting the basal hydraulic pressure.

In a case where the wheel pressure is reduced by the actuator 3 by anti-skid control or the like, the second brake ECU 902 causes the pump 315 to operate in a state where the pressure reducing valve 314 is opened and the holding valve 313 is closed and thereby pumps back the brake liquid in the wheel cylinder 81. In a case where the wheel pressure is held by the actuator 3, the second brake ECU 902 closes the holding valve 313 and the pressure reducing valve 314. When the wheel pressure is pressurized or depressurized only by operation of the electric cylinder 2 or the master cylinder unit 4, the second brake ECU 902 opens the differential pressure control valve 312 and the holding valve 313 and closes the pressure reducing valve 314.

(Summary of Configuration of Vehicle Braking Device)

The vehicle braking device 1 includes: a first hydraulic pressure output unit 31 that is connected to the master chamber 41a of the master cylinder 41 through the first liquid passage 51 and outputs a hydraulic pressure to the first wheel cylinders 81 and 82 based on the hydraulic pressure of the first liquid passage 51; the electric cylinder 2 that generates a hydraulic pressure independently of the master cylinder 41; the second hydraulic pressure output unit 32 that is connected to the electric cylinder 2 through the second liquid passage 52 and outputs a hydraulic pressure to the second wheel cylinders 83 and 84 based on the hydraulic pressure of the second liquid passage 52; the communication control valve 61 that is a normally closed electromagnetic valve that is provided in the communication passage 53 connecting the first liquid passage 51 and the second liquid passage 52 and opens and closes the communication passage 53; and the master cut valve 62 which is a normally open electromagnetic valve provided in the first liquid passage 51 on the master cylinder 41 side relative to the connection portion 50 with the communication passage 53.

(Brake ECU and Various Sensors)

The first brake ECU 901 and the second brake ECU 902 (hereinafter also referred to as "brake ECUs 901 and 902") are electronic control units each including a CPU and a memory. Each of the brake ECUs 901 and 902 includes one or a plurality of processors that execute various kinds of control. The first brake ECU 901 and the second brake ECU 902 are separate ECUs, and are connected to each other so as to be able to communicate information (control information and the like).

The first brake ECU 901 is connected to the electric cylinder 2 and the electromagnetic valves 61, 62, and 44 in a controllable manner. The second brake ECU 902 is connected to the actuator 3 in a controllable manner. The brake ECUs 901 and 902 execute various controls based on detection results of various sensors. As the various sensors, for example, the stroke sensor 71, the pressure sensors 72, 73, and 75, the level switch 74, a wheel speed sensor (not illustrated), an acceleration sensor (not illustrated), and the like are provided in the vehicle braking device 1.

The stroke sensor 71 detects a stroke of the brake operation member Z. The vehicle braking device 1 is provided with two stroke sensors 71 corresponding to the brake ECUs 901 and 902 on a one-to-one basis. The brake ECUs 901 and 902 acquire stroke information from the corresponding stroke sensors 71, respectively. The pressure sensor 72 is a sensor that detects the master pressure, and is provided, for example, in the first liquid passage 51 on the master cylinder 41 side relative to the master cut valve 62. The pressure sensor 73 is a sensor that detects the output hydraulic pressure of the electric cylinder 2, and is provided, for example, in the second liquid passage 52. The level switch 74 is provided in the reservoir 45 and detects that a liquid level in the reservoir 45 becomes less than a predetermined value. The pressure sensor 75 detects an input hydraulic pressure from the first liquid passage 51 to the first hydraulic pressure output unit 31. Detection values of the various sensors may be transmitted to both of the brake ECUs 901 and 902.

The first brake ECU 901 receives detection results of the stroke sensor 71, the pressure sensors 72 and 73, and the level switch 74, and controls the electric cylinder 2 and the electromagnetic valves 61, 62, and 44 based on the detection results. The first brake ECU 901 can calculate each wheel pressure based on the detection results of the pressure sensors 72 and 73 and a control state of the actuator 3.

The second brake ECU 902 receives detection results of the stroke sensor 71 and the pressure sensor 75, and controls the actuator 3 based on the detection results. The second brake ECU 902 can calculate each wheel pressure based on control states of the pressure sensor 75 and the actuator 3. The second brake ECU 902 includes a setting unit 94. The setting unit 94 sets a first target differential pressure that is a target value of a first differential pressure (a differential pressure between the input pressure and the hydraulic pressure of the first wheel cylinders 81 and 82) and a second target differential pressure that is a target value of a second differential pressure (a differential pressure between the input pressure and the hydraulic pressure of the second wheel cylinders 83 and 84).

The power supply device 903 is a device that supplies power to the brake ECUs 901 and 902. The power supply device 903 includes a battery. The power supply device 903 is connected to both of the brake ECUs 901 and 902. That is, in the first embodiment, power is supplied to the two brake ECUs 901 and 902 from the common power supply device 903.

Effects of Configuration of First Embodiment

According to the first embodiment, in a normal state of the electric cylinder 2, the output hydraulic pressure of the electric cylinder 2 is introduced into the first liquid passage 51 through the communication passage 53, a hydraulic pressure can be output from the first hydraulic pressure output unit 31 to the first wheel cylinders 81 and 82 based on the output hydraulic pressure, and a hydraulic pressure can be output from the second hydraulic pressure output unit 32 to the second wheel cylinders 83 and 84 based on the hydraulic pressure of the second liquid passage 52.

On the other hand, when a failure is occurring in the electric cylinder 2, the output hydraulic pressure of the master cylinder 41 is introduced into the first liquid passage 51, and a hydraulic pressure can be output from the first hydraulic pressure output unit 31 to the first wheel cylinders 81 and 82 based on the hydraulic pressure of the first liquid passage 51. The failure of the electric cylinder 2 is, for example, a failure of the first brake ECU 901 or disconnection of the electric motor 22.

In addition, even if liquid leakage occurs in the second system including the electric cylinder 2, the second liquid passage 52, the second hydraulic pressure output unit 32, and the second wheel cylinders 83 and 84, the communication passage 53 can be cut off by the communication control valve 61, and a hydraulic pressure can be output to the first wheel cylinders 81 and 82 by the master cylinder 41 and the first hydraulic pressure output unit 31. Meanwhile, even if liquid leakage occurs in the first system including the master cylinder 41, the first liquid passage 51, the first hydraulic pressure output unit 31, and the first wheel cylinders 81 and 82, the communication passage 53 can be cut off by the communication control valve 61, and a hydraulic pressure can be output to the second wheel cylinders 83 and 84 by the electric cylinder 2 and the second hydraulic pressure output unit 32.

In addition, according to the first embodiment, since the communication passage 53 is cut off by the communication control valve 61 upon occurrence of power supply failure, a hydraulic pressure can be output from the master cylinder 41 to the first wheel cylinders 81 and 82. As described above, according to the new configuration illustrated in the first embodiment, braking force can be appropriately generated even upon occurrence of failure of the device and occurrence of liquid leakage.

Another problem of the vehicle braking device having two systems is as follows. In a conventional vehicle braking device, in a case where liquid leakage occurs in a first system to which a master cylinder unit is connected, a wheel cylinder of a second system is pressurized by an electric cylinder. In this case, a communication control valve is closed, and liquid supply to the first system by the electric cylinder is prohibited. In order to prevent liquid leakage occurring due to the output of the electric cylinder, the communication control valve needs to be maintained in a closed state when the second system is pressurized by the electric cylinder.

The communication control valve 61 is a normally closed type in view of the configuration of the vehicle braking device 1, and is configured such that when the valve is closed, the valving element is biased toward the electric cylinder 2 by the biasing member so as to abut (be seated) on the valve seat. When a hydraulic pressure on the electric cylinder 2 side relative to the communication control valve 61 becomes higher than a hydraulic pressure on the wheel cylinders 81 and 82 side of the first system relative to the communication control valve 61 by a predetermined pressure, the valving element separates from the valve seat and the communication control valve 61 opens. When a differential pressure between the systems (the first system<the second system) exceeds a predetermined pressure by the operation of the electric cylinder 2 in a state where the communication control valve 61 is closed, the communication control valve 61 is opened. This predetermined pressure can be said to be a differential pressure resistance of the electromagnetic valve (a maximum differential pressure that can keep the valve closed by energization). When the communication control valve 61 is closed and the electric cylinder 2 pressurizes only the second system, the differential pressure resistance of the communication control valve 61 determines a pressurization limit of the electric cylinder 2. Therefore, in order to exert sufficient braking force in the second system, it is required to increase the differential pressure resistance of the communication control valve 61.

The differential pressure resistance is mainly determined by a spring force biasing the valving element and a pressure receiving area of the valving element (a value corresponding to a flow passage area of the valve seat). An increase in the spring force (spring constant) increases the differential pressure resistance but invites an increase in power required during valve opening control and an increase in size of a coil. In view of this, conventionally, the differential pressure resistance is increased by reducing the flow passage area of the valve seat and thereby reducing force applied to the valving element by a differential pressure. However, when the flow passage area of the valve seat is reduced, the liquid supply flow passage from the electric cylinder 2 to the wheel cylinders 81 and 82 of the first system is narrowed. Therefore, during a normal time (in a normal state), when the electric cylinder 2 supplies liquid to the first system and the second system, liquid supply to the first system is delayed as compared with liquid supply to the second system. That is, the conventional configuration has room for improvement in terms of responsiveness of the first system during a normal time.

According to the first embodiment, since the actuator 3 can pressurize the wheel cylinders 81 to 84 of both systems, it is not necessary for the electric cylinder 2 to pressurize the second wheel cylinders 83 and 84 upon occurrence of liquid leakage. Furthermore, since the actuator 3 is configured to generate a differential pressure on a downstream side with respect to the basal hydraulic pressure which is the output hydraulic pressure of the upstream unit 11, it is not necessary to increase the output hydraulic pressure of the electric cylinder 2 when pressurizing the wheel cylinder 81 to 84 of the systems. Therefore, when the second system is pressurized, the hydraulic pressure (basal hydraulic pressure) received by the communication control valve 61 in a closed state does not greatly increase.

This makes it unnecessary to reduce the flow passage area of the valve seat in order to increase the differential pressure resistance of the communication control valve 61. That is, according to the first embodiment, flow passage design is not restricted by the differential pressure resistance of the communication control valve 61, and good responsiveness can be secured for both systems. As described above, according to the first embodiment, responsiveness of each system during a normal time can be secured, and at least one system can be pressurized upon occurrence of failure.

(Normal Control, Specific Control, and Cutoff Control)

The first brake ECU 901 includes a control unit 91, a liquid leakage determination unit 92, and a specific liquid leakage determination unit 93. The control unit 91 selectively executes normal control or specific control according to a situation. Furthermore, the control unit 91 is configured to be able to execute cutoff control. The control unit 91 also serves as a cutoff control unit. The second brake ECU 902 includes a downstream control unit 95 that controls the actuator 3 in the normal control and the specific control.

The normal control is control (control mode) in which the communication control valve 61 and the simulator cut valve 44 are opened and the master cut valve 62 is closed so that the hydraulic pressure of the first wheel cylinders 81 and 82 can be adjusted by at least one of the electric cylinder 2 and the first hydraulic pressure output unit 31 and the hydraulic pressure of the second wheel cylinders 83 and 84 can be adjusted by at least one of the electric cylinder 2 and the second hydraulic pressure output unit 32.

The normal control is a by-wire mode in which the master cylinder unit 4 and the wheel cylinders 81 to 84 are hydraulically separated from each other and the wheel pressure is adjusted by control of the brake ECUs 901 and 902. Specifically, the control unit 91 drives the electric cylinder 2 based on data detected by the stroke sensor 71 and the pressure sensor 72 in a state where the master cut valve 62 is closed and the simulator cut valve 44 and the communication control valve 61 are opened. The first brake ECU 901 sets a target deceleration and a target wheel pressure based on detection results of the stroke sensor 71 and the pressure sensor 72, and controls the electric cylinder 2 so that the wheel pressure approaches the target wheel pressure. The second brake ECU 902 operates the actuator 3 when executing the anti-skid control or the like.

The specific control is control (control mode) in which the communication control valve 61 and the simulator cut valve 44 are closed and the master cut valve 62 is opened so that the hydraulic pressure of the first wheel cylinders 81 and 82 can be adjusted by the first hydraulic pressure output unit 31 and the hydraulic pressure of the second wheel cylinders 83 and 84 can be adjusted by the second hydraulic pressure output unit 32. In the specific control, the communication control valve 61 is closed, and therefore the brake liquid discharged from the electric cylinder 2 is supplied only to the second hydraulic pressure output unit 32.

Furthermore, in the specific control, the master cut valve 62 is opened, and therefore the master cylinder unit 4 and the first hydraulic pressure output unit 31 are communicated with each other. When the brake operation member Z is operated, the volume of the master chamber 41a decreases. Accordingly, the brake liquid is supplied from the master cylinder unit 4 to the actuator 3 through the opened master cut valve 62. That is, the master pressure becomes the basal hydraulic pressure input to the first hydraulic pressure output unit 31. The second brake ECU 902 controls the pump 315 and the differential pressure control valve 312 based on the data transmitted from the stroke sensor 71 and the pressure sensor 72. As described above, the first hydraulic pressure output unit 31 can generate a differential pressure according to an operation of the brake operation member Z based on the basal hydraulic pressure generated by the master cylinder unit 4 to pressurize the first wheel cylinder 81.

In the normal control, the basal hydraulic pressure generated by the upstream unit 11 is the output hydraulic pressure of the electric cylinder 2. In the specific control, the basal hydraulic pressure generated by the upstream unit 11 is the master pressure as for the first hydraulic pressure output unit 31, and is the output hydraulic pressure of the electric cylinder 2 as for the second hydraulic pressure output unit 32.

The cutoff control is control (control mode) in which the communication control valve 61 is opened, the master cut valve 62 is closed, and the piston 23 of the electric cylinder 2 is moved to the cutoff region R2. In the cutoff control, the simulator cut valve 44 is opened. The cutoff control is control in which the communication control valve 61 is opened, the master cut valve 62 is closed, and the piston 23 is moved to change a relative position between the piston 23 and the cylinder 21 from the connection position (see the communication region R1) to the cutoff position (see the cutoff region R2) at which the connection between the output chamber 24 and the reservoir 45 is cut off. An example of a timing at which the cutoff control is executed will be described later.

The brake ECUs 901 and 902 may adjust the wheel pressure while maintaining the position of the piston 23 in the cutoff region R2. For example, the electric cylinder 2 can operate by moving the piston 23 in the axial direction while maintaining the cutoff region R2, and thus the wheel pressure can be adjusted. Furthermore, by moving the piston 23 while maintaining the cutoff region R2 according to the operation of the actuator 3 (for example, by generating a basal hydraulic pressure), the brake liquid can be flowed between the electric cylinder 2 and the actuator 3, and thus the wheel pressure can be adjusted by the actuator 3. That is, the actuator 3 can execute control such as anti-skid control even during the cutoff control. During the cutoff control, the control unit 91 adjusts the wheel pressure by the electric cylinder 2 in principle, and operates the actuator 3 when executing the anti-skid control or the like.

(Liquid Leakage Determination)

The liquid leakage determination unit 92 determines whether or not liquid leakage has occurred. As an example, the liquid leakage determination unit 92 determines whether or not liquid leakage has occurred based on the liquid level of the reservoir 45. The liquid leakage determination unit 92 determines whether or not liquid leakage has occurred (whether or not probability of liquid leakage is high) based on the detection result of the level switch 74. The liquid leakage determination unit 92 determines that liquid leakage has occurred when the liquid level of the brake liquid in the reservoir 45 becomes less than a predetermined value.

The specific liquid leakage determination unit 93 determines whether or not liquid leakage (hereinafter referred to as "specific liquid leakage") has occurred in the first liquid passage 51, the second liquid passage 52, a liquid passage 310 connecting the first hydraulic pressure output unit 31 and the first wheel cylinders 81 and 82, or a liquid passage 320 connecting the second hydraulic pressure output unit 32 and the second wheel cylinders 83 and 84. It can be said that the specific liquid leakage determination unit 93 determines whether or not liquid leakage (external leakage) has occurred in the liquid passages 310 and 320 and portions 510 and 520 of the first liquid passage 51 and the second liquid passage 52 that connect the upstream unit 11 and the actuator 3.

For example, in a case where the detection value of the pressure sensor 73 does not increase in a state where the electric cylinder 2 slides along the axial direction by a predetermined stroke or more from the initial position by execution of the normal control to supply the brake liquid, the specific liquid leakage determination unit 93 determines that the specific liquid leakage has occurred. In a case where the brake liquid leaks from at least one of the liquid passage 310, the liquid passage 320, the first liquid passage 51, and the second liquid passage 52, the output hydraulic pressure of the electric cylinder 2 does not increase. The specific liquid leakage determination unit 93 may determine whether or not specific liquid leakage has occurred based on a difference between a target deceleration and an actual deceleration (for example, a detection result of the acceleration sensor). Note that it can be said that the liquid passage 310 is a part of the liquid passage 311.

Control Example 1

Figure 4:
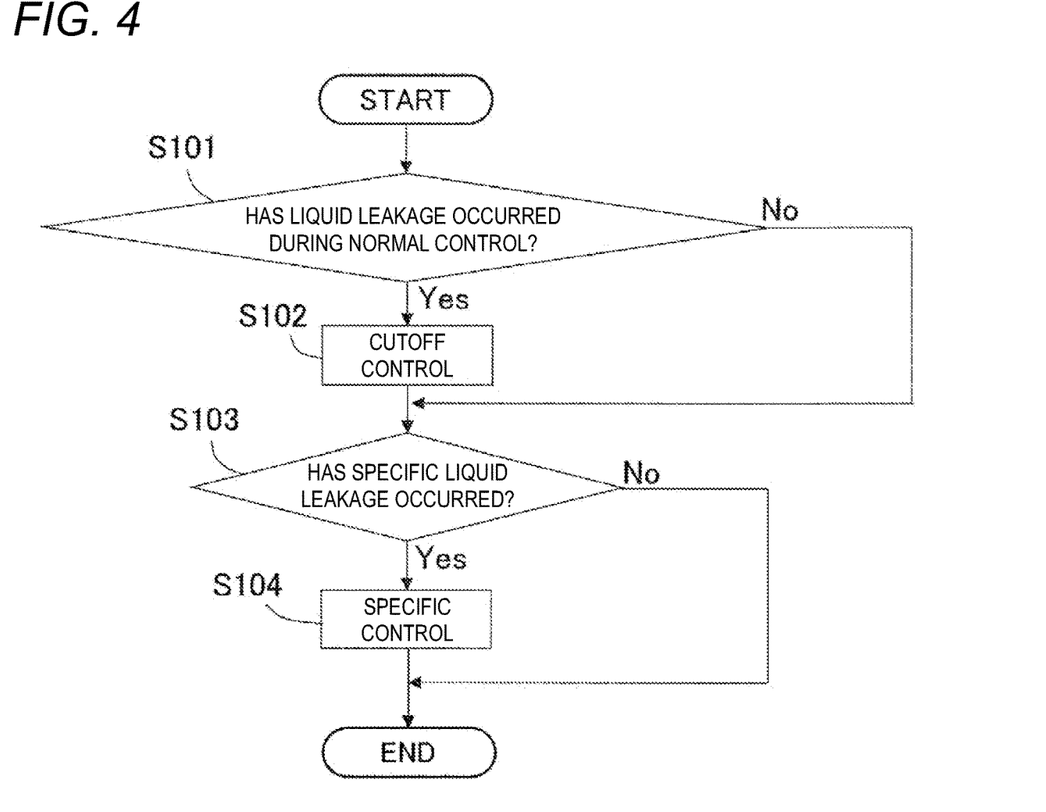
FIG. 4 is a flowchart illustrating a control example according to the first embodiment.

Control Example 1 will be described with reference to FIG. 4. The control unit 91 executes the normal control when a predetermined condition is satisfied. Specifically, the control unit executes the normal control, for example, when an ignition of a vehicle is turned on. That is, the braking control during a normal time (normal state) is executed in a by-wire mode. The case where the ignition is turned on includes, for example, a case where an electric vehicle is activated to be able to start.

In a case where the liquid level in the reservoir 45 becomes less than the predetermined value and the liquid leakage determination unit 92 determines that liquid leakage has occurred (S101: Yes), the control unit 91 executes the cutoff control (S102). For example, in a case where the liquid level in the reservoir 45 becomes less than the predetermined value in a state where the brake operation member Z is not operated and the electric cylinder 2 and the actuator 3 are not operating, it is highly likely that the brake liquid is leaking from somewhere. Therefore, by closing the input port 211 of the electric cylinder 2 by the cutoff control, the connection between the reservoir 45 and the wheel cylinders 81 to 84 via the electric cylinder 2 is cut off.

Furthermore, since the closed state of the master cut valve 62 is maintained even when the cutoff control is executed, the connection between the reservoir 45 and the first wheel cylinders 81 and 82 via the master cylinder unit 4 is also cut off. That is, the connection between the reservoir 45 and the wheel cylinders 81 to 84 is cut off by the cutoff control.

In a case where for example, an actual wheel pressure does not increase although a target wheel pressure increases during the normal control or the cutoff control and therefore the specific liquid leakage determination unit 93 determines that specific liquid leakage (external leakage) has occurred (S103: Yes), the control unit 91 executes the specific control (S104). As a result, the control mode is switched from the normal control (by-wire mode) to the specific control. In a case where the piston 23 of the electric cylinder 2 is in the cutoff region R2, the electric motor 22 is turned off by execution of the specific control, the piston 23 is returned to the initial position by the biasing member 25, and the input port 211 is opened. The piston 23 may be returned to the initial position by reverse rotation of the electric motor 22. The specific liquid leakage determination may be performed before the liquid leakage determination.

As described above, the control unit 91 executes the normal control in principle, executes the cutoff control based on the determination of the liquid leakage determination unit 92, and executes the specific control based on the determination of the specific liquid leakage determination unit 93. It can be said that the first brake ECU 901 constantly (at predetermined intervals) monitors the presence or absence of liquid leakage after activation. Furthermore, it can be said that the first brake ECU 901 constantly (at predetermined intervals) monitors the presence or absence of specific liquid leakage during execution of pressurization control and holding control. Note that during occurrence of an electrical failure of the upstream unit 11 and/or the first brake ECU 901, the communication control valve 61 is closed and the master cut valve 62 is opened, and therefore the first wheel cylinders 81 and 82 can be pressurized by the master cylinder unit 4. During occurrence of an electric failure of the actuator 3 and/or the second brake ECU 902, the wheel cylinders 81 to 84 can be pressurized by the electric cylinder 2. The electrical failure is a failure of the brake ECU 901 or 902, a short circuit of an electromagnetic valve included in each unit, or the like.

(Effect of Cutoff Control)

When the cutoff control is executed, the liquid passage is closed by the electric cylinder 2 and the master cut valve 62 as described above, and therefore theoretically, such a change that the liquid passage becomes a negative pressure, that is, liquid leakage to the outside does not occur in a state where the basal hydraulic pressure is not generated by the operation of the electric cylinder 2 even if there is a portion where liquid leakage is occurring. Therefore, according to the cutoff control, liquid leakage in the liquid passages 310 and 320 and mixing of air into a liquid passage can be suppressed. In a case where the brake operation member Z is operated (in a case where the target wheel pressure increases) during the cutoff control, the control unit 91 pressurizes the wheel cylinders 81 to 84 by at least one of the electric cylinder 2 and the actuator 3 while maintaining the cutoff state.

In the first embodiment, the length of the cutoff region R2 is larger than the length of the communication region R1. Therefore, when the cutoff control is executed from a state in which the piston 23 is at the initial position, the piston 23 can be moved from the communication region R1 to the cutoff region R2 without largely moving the piston 23 to one side in the axial direction. As a result, an amount of brake liquid discharged from the electric cylinder 2 by the cutoff control is suppressed, and liquid leakage is suppressed accordingly. In addition, since the cutoff region R2 is large, reserve power (brake liquid amount) of the electric cylinder 2 in a case where the actuator 3 is operated during the cutoff control increases. In particular, in the first embodiment, since the communication region R1 is only in the vicinity of the initial position of the piston 23 (in an initial drive region including the initial position), the input port 211 can be cut off by a small movement of the piston 23. For example, the wheel pressure does not fluctuate by movement of the piston 23 to one side in the axial direction in the initial drive region.

(Effect of Specific Control)

As described above, for example, in a case where the actual wheel pressure (the detection result of the pressure sensor 73 in this example) is less than the target wheel pressure by a predetermined pressure or more during the normal control or the cutoff control, the specific control is executed. According to the execution of the specific control, the first system can be pressurized by the master cylinder unit 4, and the wheel cylinders 81 to 84 of both systems can be pressurized by the actuator 3. This makes it possible to pressurize the wheel pressure in a normal system.

The brake liquid is supplied from the reservoir 45 (the chamber 451) to the first hydraulic pressure output unit 31 via the master cylinder unit 4, and the brake liquid is supplied from the reservoir 45 (the chamber 452) to the second hydraulic pressure output unit 32 via the electric cylinder 2. Since the chamber 451 and the chamber 452 are separated in the reservoir 45, a state where the first system and the second system are substantially separated is created, and even if air is mixed into a damaged system, mixing of air into a normal system is prevented. When air is mixed into a system, the hydraulic pressure does not sufficiently rise even if the system is normal, and there is a possibility that sufficient braking force cannot be obtained. However, according to the specific control, mixing of air into the normal system can be suppressed, and braking force can be more reliably generated in the normal system.

Control Example 2

In Control Example 2, the control unit 91 executes the cutoff control together with the normal control regardless of determination made by the liquid leakage determination unit 92. The control unit 91 executes the normal control and the cutoff control, for example, in a case where the ignition is turned on. The control unit 91 moves the piston 23 to the cutoff region R2, and adjusts each wheel pressure while maintaining the state where the piston 23 is in the cutoff region R2. As a result, regardless of the presence or absence of liquid leakage, the wheel pressure is adjusted by the electric cylinder 2 or both the electric cylinder 2 and the actuator 3 in a state where the reservoir 45 and the wheel cylinders 81 to 84 are cut off from each other.

According to Control Example 2, even in a case where one of the liquid passages 310 and 320 is damaged by, for example, a flying stone or the like during traveling, leakage of the brake liquid from a damaged portion and mixing of air into the liquid passage are suppressed since the input port 211 of the electric cylinder 2 is closed and the master cut valve 62 is closed. According to Control Example 2, since the cutoff control is executed simultaneously with the normal control, it is possible to suppress liquid leakage from a time of pipe breakage. In the case of Control Example 2, the level switch 74 and the liquid leakage determination unit 92 can be excluded from the configuration of the vehicle braking device 1.

Control Example 3

In Control Example 3, in the specific control, the control unit 91 adjusts the hydraulic pressure (basal hydraulic pressure) input to the second hydraulic pressure output unit 32 by the electric cylinder 2 within a range in which the closed state of the communication control valve 61 is maintained. When the output hydraulic pressure of the electric cylinder 2 (a hydraulic pressure on the second system side relative to the communication control valve 61) becomes higher than the hydraulic pressure of the first wheel cylinders 81 and 82 (a hydraulic pressure on the first system side relative to the communication control valve 61) by a predetermined pressure or more, the communication control valve 61 in the closed state is opened. This predetermined pressure corresponds to a differential pressure resistance of the communication control valve 61 determined by the structure.

The communication control valve 61 is not opened even if the electric cylinder 2 pressurizes the second wheel cylinders 83 and 84 until a differential pressure between the inlet and outlet of the communication control valve 61 (hereinafter also referred to as a "differential pressure between the systems") exceeds the differential pressure resistance. Therefore, the control unit 91 can cause the electric cylinder 2 to operate even during the specific control, for example, until the differential pressure between the systems (the hydraulic pressure of the second system>the hydraulic pressure of the first system) reaches the differential pressure resistance of the communication control valve 61. As described above, according to Control Example 3, the second wheel cylinders 83 and 84 can be pressurized by the electric cylinder 2 and the actuator 3 in the specific control.

Modification of First Embodiment

Figure 5:
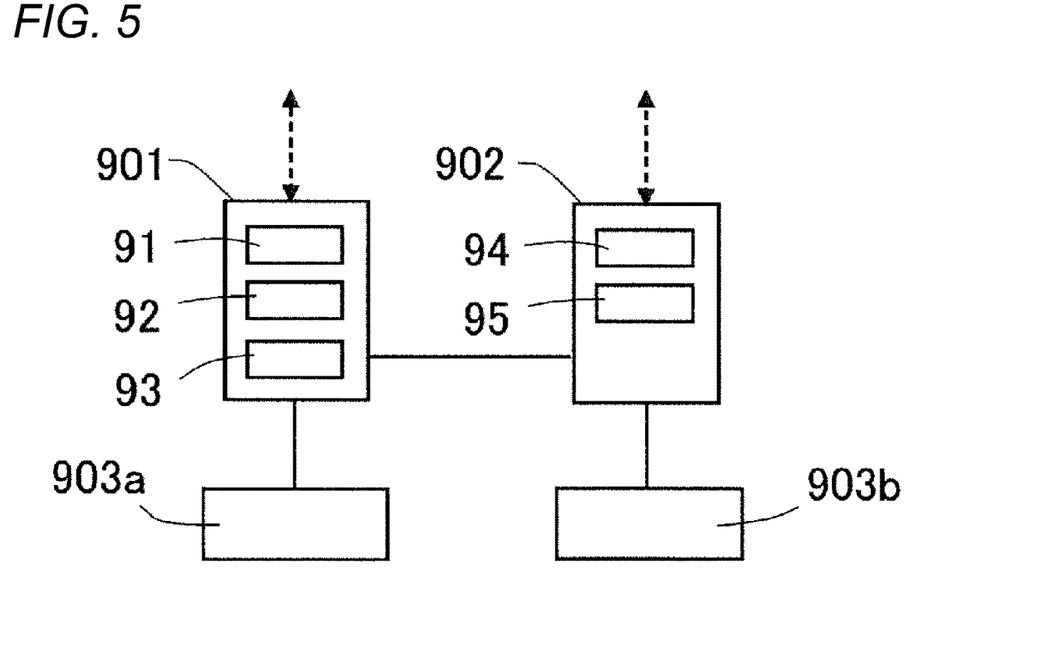
FIG. 5 is a conceptual diagram illustrating a modification of a power supply device according to the first embodiment.

As illustrated in FIG. 5, the power supply device 903 may include a first power supply 903a that supplies power to the first brake ECU 901 and a second power supply 903b that supplies power to the second brake ECU 902 independently of the first power supply 903a. In this case, for example, the first power supply 903a includes a first battery, and the second power supply 903b includes a second battery separate from the first battery. As a result, even if a failure occurs in one power supply or power supply line, the first brake ECU 901 or the second brake ECU 902 operates by the other power supply. That is, even if power supply from one power supply is stopped due to a failure or the like, the electric cylinder 2 or the actuator 3 can operate, and braking force can be generated. According to this configuration, redundancy is further improved.

Second Embodiment

Figure 6:
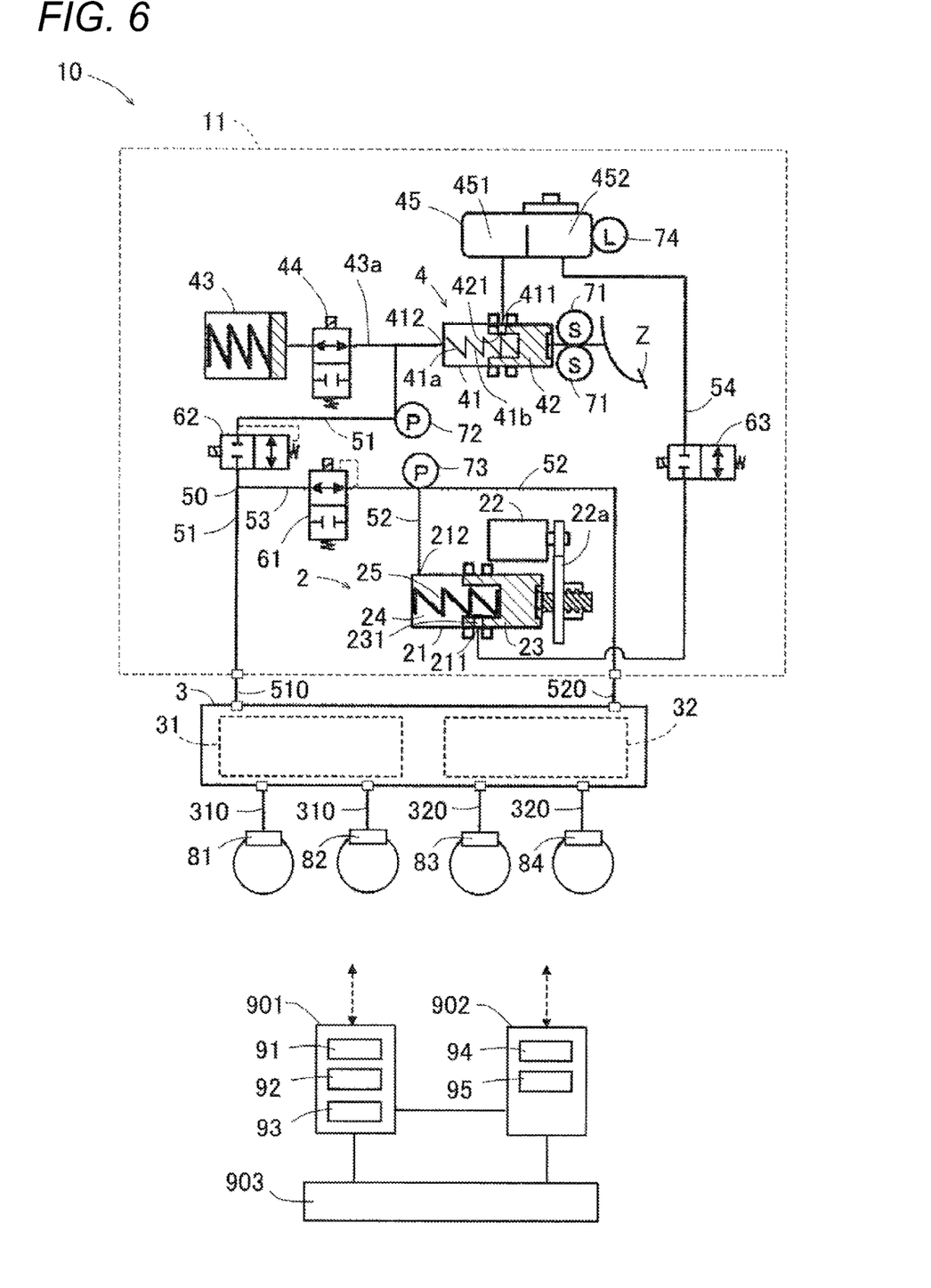
FIG. 6 is a configuration diagram of a vehicle braking device according to a second embodiment.

As illustrated in FIG. 6, a vehicle braking device 10 of a second embodiment includes a supply passage control valve 63 that is provided in a brake liquid supply passage 54 connecting an electric cylinder 2 and a reservoir 45 and opens and closes the brake liquid supply passage 54. The supply passage control valve 63 is a normally open electromagnetic valve. In the description of the second embodiment, the description and the drawings of the first embodiment can be appropriately referred to.

A control unit 91 closes the supply passage control valve 63 instead of the cutoff control of the first embodiment, for example, at the execution timing of the cutoff control of the first embodiment. It can be said that cutoff control of the second embodiment is control for closing the supply passage control valve 63. FIG. 6 illustrates a state in which the supply passage control valve 63 is closed during normal control (in a by-wire mode).

As in the first embodiment, a timing of execution of the cutoff control is set, for example, to a case where a liquid leakage determination unit 92 determines that liquid leakage has occurred or a case where an ignition of a vehicle is turned on. According to the second embodiment, connection between the reservoir 45 and the electric cylinder 2 is cut off during the normal control, and effects similar to those of the cutoff control of the first embodiment are produced. For example, the cutoff control of Control Examples 1 to 3 of the first embodiment can be replaced with the closing of the supply passage control valve 63. From the viewpoint of the number of components, the first embodiment is advantageous. Further, the modification of the first embodiment (the configuration in FIG. 5) can also be applied to the second embodiment.

Other Remarks

The disclosure here is not limited to the above embodiments and control examples. For example, the actuator 3 may include an electric cylinder instead of the pump 315. Furthermore, the vehicle braking devices 1 and 10 may include a pressurizing unit including, for example, a pump instead of the electric cylinder 2 as a hydraulic pressure generating unit. Furthermore, the control unit 91 may be configured not to execute the cutoff control. The disclosure here can also be applied to, for example, a vehicle (hybrid vehicle or electric vehicle) including a regenerative braking device, a vehicle that executes automatic brake control, or an autonomous vehicle.

The disclosure here can also be applied to a so-called cross pipe. In this case, for example, the first wheel cylinder 81 and the second wheel cylinder 83 are provided on front wheels, and the first wheel cylinder 82 and the second wheel cylinder 84 are provided on rear wheels. Furthermore, although the master cylinder unit 4, the reservoir 45, the stroke simulator 43, the simulator cut valve 44, the master cut valve 62, the communication control valve 61, and the electric cylinder 2 are disposed in one module in the above embodiments, these members may be disposed separately in a plurality of modules. For example, the components other than the electric cylinder 2 described above may be disposed in one module, and the electric cylinder 2 may be disposed in another module.

The invention claimed is:

1. A vehicle braking device comprising:
   a first hydraulic pressure output unit that is connected to a master chamber of a master cylinder through a first liquid passage and outputs a hydraulic pressure to a first wheel cylinder based on a hydraulic pressure of the first liquid passage;
   a hydraulic pressure generating unit that generates a hydraulic pressure independently of the master cylinder;
   a second hydraulic pressure output unit that is connected to the hydraulic pressure generating unit through a second liquid passage and outputs a hydraulic pressure to a second wheel cylinder based on a hydraulic pressure of the second liquid passage;
   a communication control valve provided in a communication passage connecting the first liquid passage and the second liquid passage, the communication control valve being a normally closed electromagnetic valve that opens and closes the communication passage; and
   a master cut valve that is a normally open electromagnetic valve provided on the first liquid passage on a master cylinder side relative to a connection portion with the communication passage, wherein
   the hydraulic pressure generating unit is an electric cylinder that generates a hydraulic pressure in an output chamber when a piston driven by an electric motor slides in a cylinder, and is configured such that the output chamber is connected to a reservoir that stores brake liquid in a case where a relative position between the piston and the cylinder is a predetermined connection position,
   the vehicle braking device further comprises a cutoff control unit configured to be capable of executing cutoff control of opening the communication control valve, closing the master cut valve, and moving the piston to change the relative position between the piston and the cylinder from the connection position to a cutoff position where connection between the output chamber and the reservoir is cut off,
   the vehicle braking device further comprises a liquid leakage determination unit that determines whether liquid leakage has occurred, and
   the cutoff control unit executes the cutoff control in a case where the liquid leakage determination unit determines that liquid leakage has occurred.

2. The vehicle braking device according to claim 1, further comprising a supply passage control valve that is provided in a brake liquid supply passage connecting the hydraulic pressure generating unit and the reservoir and opens and closes the brake liquid supply passage, wherein the cutoff control unit closes the supply passage control valve in a case where the liquid leakage determination unit determines that liquid leakage has occurred.

3. A vehicle braking device comprising:
   a first hydraulic pressure output unit that is connected to a master chamber of a master cylinder through a first liquid passage and outputs a hydraulic pressure to a first wheel cylinder based on a hydraulic pressure of the first liquid passage,
   a hydraulic pressure generating unit that generates a hydraulic pressure independently of the master cylinder;
   a second hydraulic pressure output unit that is connected to the hydraulic pressure generating unit through a second liquid passage and outputs a hydraulic pressure to a second wheel cylinder based on a hydraulic pressure of the second liquid passage;
   a communication control valve provided in a communication passage connecting the first liquid passage and the second liquid passage, the communication control valve being a normally closed electromagnetic valve that opens and closes the communication passage; and
   a master cut valve that is a normally open electromagnetic valve provided on the first liquid passage on a master cylinder side relative to a connection portion with the communication passage, wherein
   the vehicle braking device further comprises a control unit configured to selectively execute
   normal control of opening the communication control valve and closing the master cut valve so that a hydraulic pressure of the first wheel cylinder is adjustable by at least one of the hydraulic pressure generating unit and the first hydraulic pressure output unit and a hydraulic pressure of the second wheel cylinder is adjustable by at least one of the hydraulic pressure generating unit and the second hydraulic pressure output unit, and specific control of closing the communication control valve and opening the master cut valve so that the hydraulic pressure of the first wheel cylinder is adjustable by the first hydraulic pressure output unit and the hydraulic pressure of the second wheel cylinder is adjustable by the second hydraulic pressure output unit, the vehicle braking device further comprises a specific liquid leakage determination unit that determines whether liquid leakage has occurred in the first liquid passage, the second liquid passage, a liquid passage connecting the first hydraulic pressure output unit and the first wheel cylinder, or a liquid passage connecting the second hydraulic pressure output unit and the second wheel cylinder, and the control unit executes the specific control in a case where the specific liquid leakage determination unit determines that liquid leakage has occurred.

4. The vehicle braking device according to claim 3, further comprising a supply passage control valve that is provided in a brake liquid supply passage connecting the hydraulic pressure generating unit and the reservoir and opens and closes the brake liquid supply passage, wherein the control unit closes the supply passage control valve in a case where the specific liquid leakage determination unit determines that liquid leakage has occurred.

5. The vehicle braking device according to claim 3, wherein in the specific control, the control unit adjusts a hydraulic pressure input to the second hydraulic pressure output unit by the hydraulic pressure generating unit within a range in which a closed state of the communication control valve is maintained.

6. The vehicle braking device according to claim 3, further comprising:

a first brake ECU that controls the hydraulic pressure generating unit;

a second brake ECU that controls the first hydraulic pressure output unit and the second hydraulic pressure output unit; and a power supply device that supplies power to the first brake ECU and the second brake ECU.

7. The vehicle braking device according to claim 6, wherein the power supply device includes a first power supply that supplies power to the first brake ECU and a second power supply that supplies power to the second brake ECU independently of the first power supply.

* * * * *